(12) United States Patent
Cunillera I Zarate

(10) Patent No.: US 6,684,758 B1
(45) Date of Patent: Feb. 3, 2004

(54) PROCESS FOR PRODUCING ICE CREAMS AND MACHINE FOR IMPLEMENTING SUCH PROCESS

(75) Inventor: Angel Cunillera I Zarate, Reus (ES)

(73) Assignee: Big Drum Iberica, S.A., Tarragona (ES)

( * ) Notice: Subject to any disclaimer, the term of this patent is extended or adjusted under 35 U.S.C. 154(b) by 0 days.

(21) Appl. No.: 09/720,072

(22) PCT Filed: Jun. 22, 1999

(86) PCT No.: PCT/ES99/00187

§ 371 (c)(1),
(2), (4) Date: Feb. 1, 2001

(87) PCT Pub. No.: WO99/66803

PCT Pub. Date: Dec. 29, 1999

(30) Foreign Application Priority Data

Jun. 22, 1998 (ES) ................................. 9801301

(51) Int. Cl.[7] .............................. A23L 1/00; A23P 1/00; A23G 3/00; A23G 9/04; A21C 15/02
(52) U.S. Cl. ............................. 99/353; 99/352; 99/355; 99/443 C; 99/450.6; 99/450.7
(58) Field of Search ................................ 99/339, 443 R, 99/340, 443 C, 352–355, 426–442, 450.1, 450.2, 450.4, 450.6, 450.7, 484, 494, 386; 426/297, 89, 94, 95, 100, 101, 104, 138, 139, 283, 284, 502, 391

(56) References Cited

U.S. PATENT DOCUMENTS

| | | |
|---|---|---|
| 1,637,556 A | 8/1927 | DeNaro |
| 1,850,356 A | 3/1932 | Parr |
| 4,247,567 A | 1/1981 | Momiyama |
| 4,537,121 A * | 8/1985 | Bero et al. .................. 99/450.4 |
| 4,612,852 A * | 9/1986 | Price et al. ................. 99/450.4 |
| 4,694,741 A * | 9/1987 | Haas, Sr. et al. ............. 99/354 |
| 4,910,030 A | 3/1990 | Trojahn |
| 5,336,511 A * | 8/1994 | Der Beek ................. 99/439 X |
| 5,493,957 A * | 2/1996 | Kennedy et al. ........... 99/450.4 |
| 5,515,962 A * | 5/1996 | Kennedy et al. .......... 99/484 X |
| 5,540,141 A * | 7/1996 | Grubzak ................. 99/450.7 X |
| 5,692,433 A * | 12/1997 | Akesson et al. .......... 99/494 X |
| 5,709,898 A | 1/1998 | Biggs et al. |
| 5,958,493 A * | 9/1999 | Grigoli ...................... 99/455 X |
| 5,988,047 A * | 11/1999 | Haas et al. .................... 99/353 |

FOREIGN PATENT DOCUMENTS

| | | |
|---|---|---|
| FR | 2577760 A | 8/1986 |
| GB | 2168233 A | 6/1996 |
| WO | WO 99/66803 | 12/1999 |

* cited by examiner

Primary Examiner—Timothy F. Simone
(74) Attorney, Agent, or Firm—Katten Muchin Zavis Rosenman

(57) ABSTRACT

Starting with stiff, flat wafers in laminar form, ready-made, the wafers are laid unitarily on trays (3) fitted on a conveyor belt (2), which causes them to pass through a tunnel (5) wherein they are subjected to heating until softened, after which the trays (3), of a three-part structure, have their side segments swivel with respect to their central segment reshaping the respective pieces of wafer into a fluted form having a U-shaped section, assisted in this wafer-shaping process by a pressing mechanism (14) equipped with a plurality of tampers (17) which act sequentially and unitarily on the respective trays, helping in the cooling of the wafers for these to retain their reshaped form in a stable manner, there being mounted immediately thereafter and on the conveyor belt (2) itself an ice-cream feeder mechanism (18), the ice cream filling the fluted bodies defined by the wafers after being reshaped.

4 Claims, 4 Drawing Sheets

PROCESS FOR PRODUCING ICE CREAMS AND MACHINE FOR IMPLEMENTING SUCH PROCESS

FIELD OF THE INVENTION

The present invention relates to a procedure for manufacturing ices, specifically for the manufacture of ice creams with a wafer envelope, with which an end product is procured different to that habitually found with this type of ice creams, specifically based on a single piece of wafer, duly shaped to receive the ice cream in its inside.

The invention also concerns the machine for implementing said procedure and, consequently, for obtaining the new ice cream.

BACKGROUND TO THE INVENTION

Within the gamut of ice creams, served in origin partially enclosed in wafer, there are two basic presentations, one in which the wafer takes the form of a "cone" or cornet, which duly shaped is subsequently filled with the ice cream, and another in which the bulk ice cream is positioned between two wafer sheets constituting what is usually termed a "wafer".

In this second group of ice creams the starting point is usually rectangular wafer sheets, so that the ice cream is formed with the assistance of two such sheets, in a parallel disposition and suitably spaced in accordance with the intended size of the ice cream.

SUMMARY OF THE INVENTION

The procedure which the invention proposes has the objective of achieving a result which is approximately that of the ices of the aforementioned second type, but with the particularity that a single piece of duly shaped wafer is employed.

To this end and more specifically, the procedure which the invention proposes starts with the employment of a wafer, of appropriate shape and dimensions, initially flat, to which a thermal process is applied whereby its rigid constitution becomes pliable, which permits it to be reshaped. Immediately thereafter said wafer is subjected to a reshaping step until a fluted profile is formed, approximately U-shaped, with rounded vertices, by means of folding the marginal areas of the wafer piece towards the imaginary vertical and middle plane thereof, it being thereafter subjected to a cooling step for the wafer to recover its stiff constitution and, as a consequence, retain in a stable manner the reshaping it has undergone. The process concludes with the insertion into the trough of the fluted body shaped from the single piece of wafer, of the corresponding bulk ice cream which fills it inside, leaving the product ready to be packed for distribution. This product or bulk ice cream can be produced on site in the machine itself or be ready-shaped bulk ice cream which is introduced in this step of the process.

The machine for implementing this procedure comes with a conveyor belt on which an alignment is formed of the receptacle trays for the respective wafers, each of said trays being made up of three parts, one central and fixed and two foldable sides, each of the latter having a roller which runs on the corresponding guide rail, so that the three constituent parts of each tray are maintained horizontal during the reception and thermal processing of the wafer and tilt, by means of suitable conforming of the guide rails mentioned, at the moment foreseen for the shaping of the wafer.

On this conveyor belt, and after an initial open area for the positioning of the wafers, a tunnel oven is mounted in which the thermal processing is performed for the softening of the wafers, and at the exit from this tunnel oven a pressing mechanism is located with the twofold function of, on one hand steadying each already shaped wafer in position within the corresponding tray and, on the other cooling the wafer sufficiently for the latter to be fixed in shape.

After the pressing mechanism mentioned, an ice-cream feeder mechanism is mounted, with which each piece of wafer is filled, in accordance with the quantity pre-established for this purpose, or on the other hand, the insertion step is located for inserting the previously prepared bulk ice cream.

BRIEF DESCRIPTION OF THE DRAWINGS

To complement the description being made and with the object of assisting in a better understanding of the features of the invention, in accordance with a preferable example of a practical embodiment thereof, a set of drawings are attached, forming an integral part of said description, in which drawings in an illustrative and not restrictive manner, the following is shown.

DESCRIPTION OF THE PREFERRED EMBODIMENT OF THE INVENTION

Figure 1:
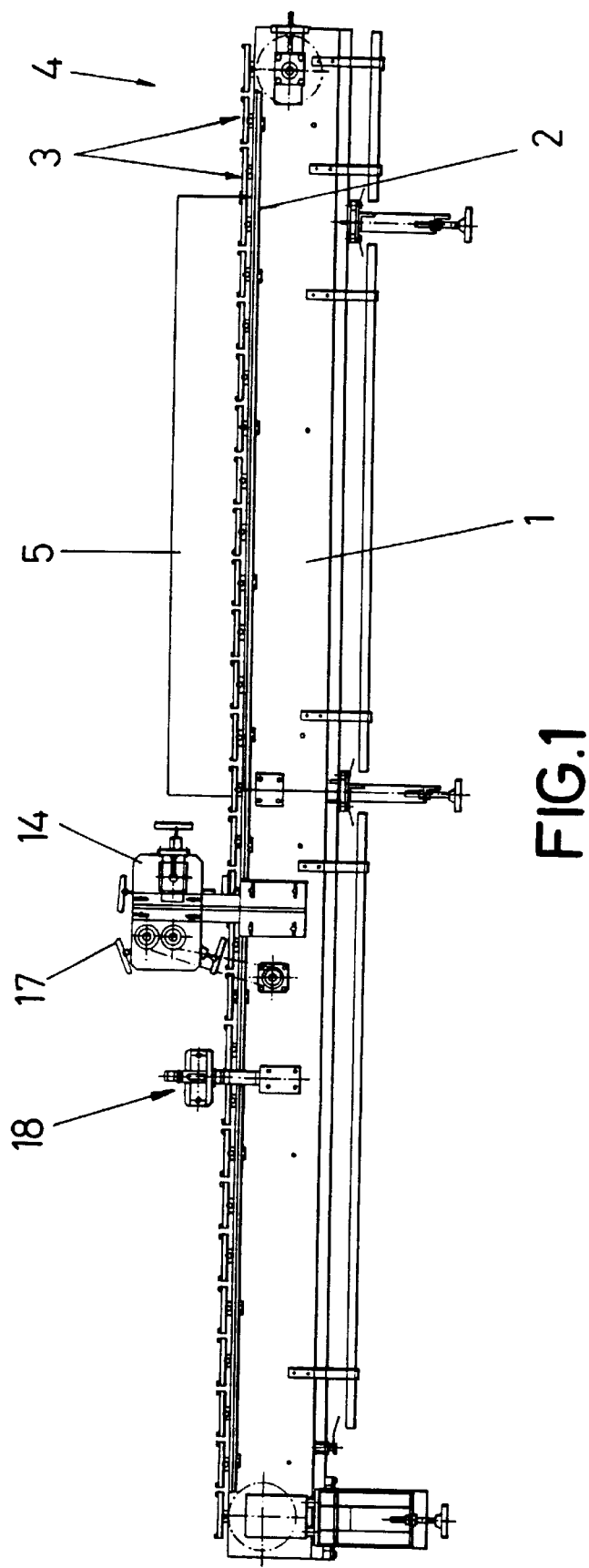
FIG. 1 Shows in schematic form a side elevation of a machine for implementing the procedure for manufacturing ices object of the present invention.
Figure 2:
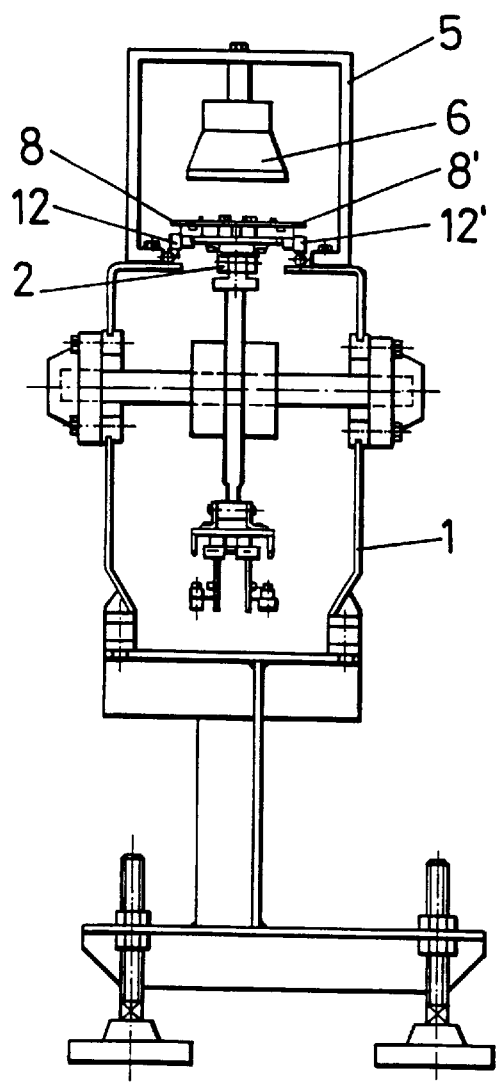
FIG. 2 Shows a detail in cross section of said machine at the level of the thermal processing oven.
Figure 5:
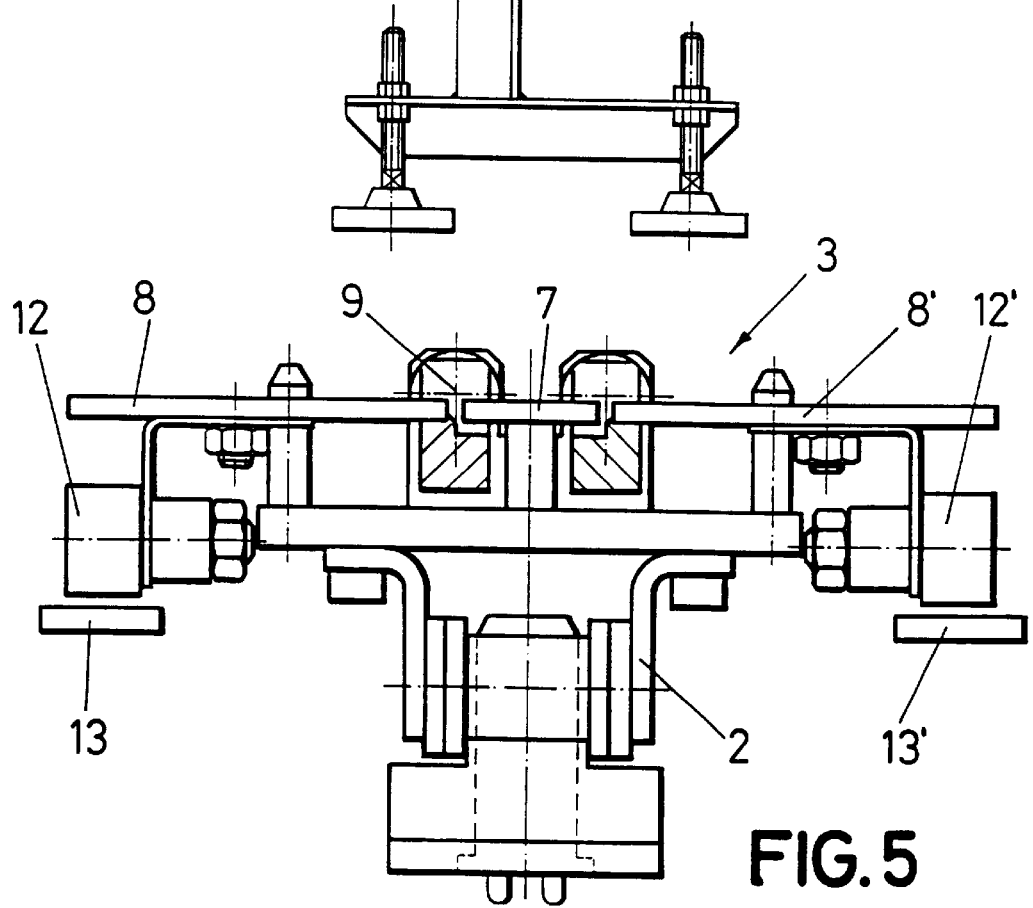
FIG. 5 Shows an exploded cross-sectional detail drawing of the conveyor belt at the level of one of the wafer receptacle trays in the wafer receiving position.
Figure 6:
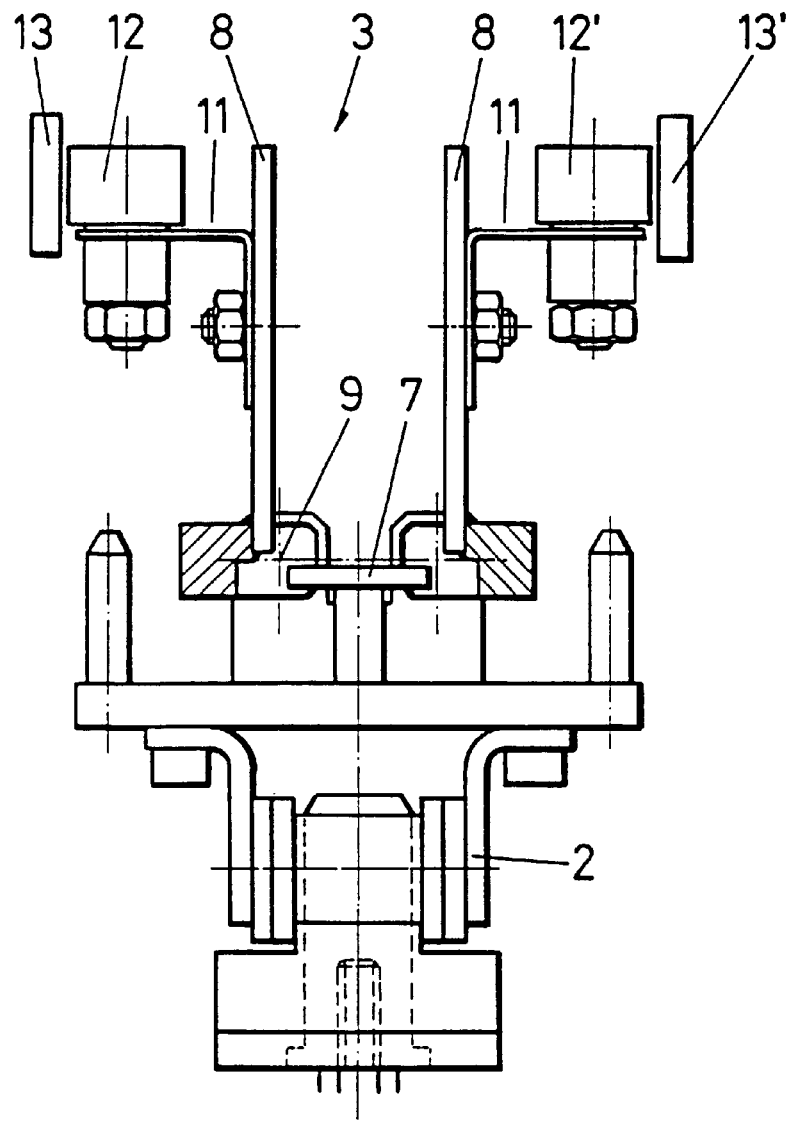
FIG. 6 Shows the same detail as the preceding figure but in the step corresponding to the final shaping of the wafer.

In the light of these figures it can be seen how the machine for implementing the procedure of the invention is built on a frame (1), of suitable length, on which is installed a conveyor belt (2) fitted with a plurality of trays (3) receptacles of the pieces of wafer, ready-made, stiff and flat in shape, there being established on the horizontal, upper and operational area of said conveyor belt (2) and in correspondence with its starting end (4), an open area for positioning the wafers unitarily on the corresponding trays (3), and immediately following a tunnel oven (5), with its corresponding heater lamps (6), as is shown schematically in FIG. 2, the power of said lamps (6) and the length of the tunnel (5) being appropriate in the measure that, as a function of the operational speed planned for the machine, the pieces of wafer at the exit from the tunnel (5) are suitably softened, that is they acquire a pliable constitution, which permits them to be reshaped, said reshaping being achieved through a change in form of the trays (3) themselves and as can be seen in the FIGS. 5 and 6.

Figure 7:
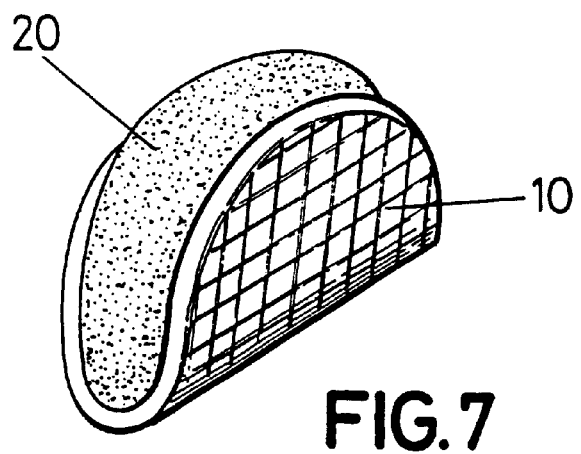
FIG. 7 Shows, finally, a perspective of the finished ice, i.e. of the end product obtained with the procedure and the machine of the invention.

More specifically each tray (3) is a three-part structure, one central piece (7), rigidly joined to the belt (2), which permanently keeps its horizontal disposition, and two side pieces (8–8'), hinged to the belt through swivel shafts (9), so that said side pieces are capable of adopting a horizontal and coplanar disposition with respect to the central piece (7) shown in FIG. 5, in the wafer receiving and heating steps, while at the exit from the tunnel oven (5) and as is shown in FIG. 6, they are capable of being swivelled upwards symmetrically, in order to achieve the final shape of the wafer (10) shown in FIG. 7.

To this end, each one of these hinged pieces (8–8') incorporates integrally on its outside face and with the help of a support (11), a roller (12), so that the two rollers (12–12') run on respective guide rails or tracks (13–13'), which also in the initial area (4) of the belt and in the area corresponding to the oven (5) are horizontal, but which at the exit from the oven undergo a change in form, concretely a turning movement which, as is shown in said FIG. 6, forces the pieces (8–8') to swivel and fold the marginal areas of the wafer (10).

Figure 3:
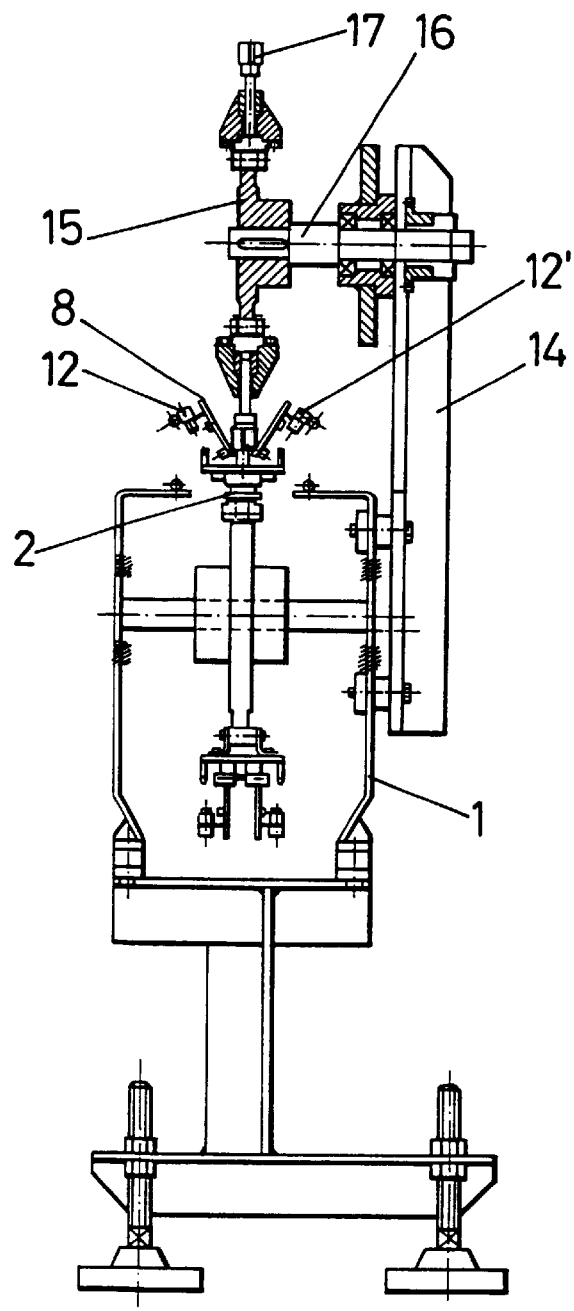
FIG. 3 Shows a similar section to that of the preceding figure but prepared at the level of the pressing mechanism.

Immediately following on the conveyor belt (2) is mounted a pressing mechanism (14), as can be seen in FIG. 3, based on a rotating drum (15), which turns about a horizontal shaft (16), transversal to the belt itself and suitably synchronised with the forward motion of the latter, said drum (15) incorporating a plurality of radial arms each of which is terminated in a corresponding tamper (17), said tampers acting successively on the trays (3), and more specifically on the wafer formed in the trough of said trays, in order to assist in their shaping.

Figure 4:
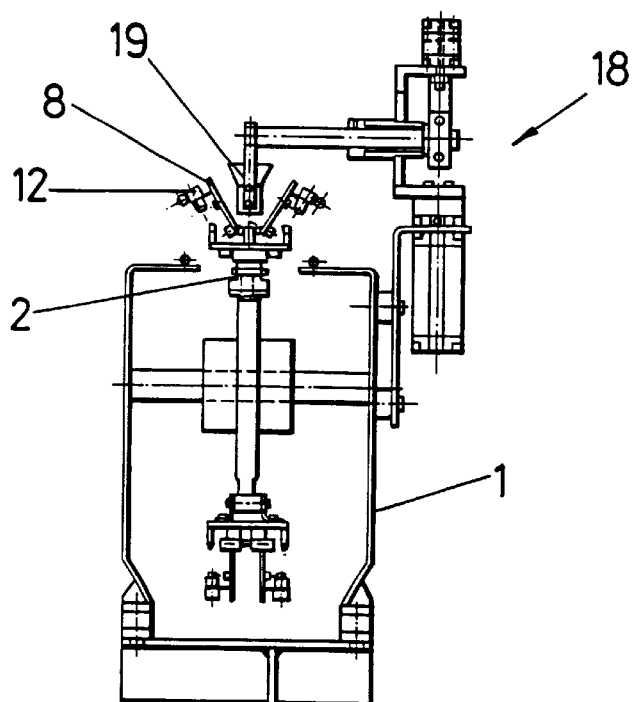
FIG. 4 Shows another representation similar to those of FIGS. 2 and 3 but in this case corresponding to the ice-cream feeder mechanism.

Finally and beyond this pressing mechanism (14), the machine incorporates an ice-cream feeder mechanism (18), for example through the mouthpiece (19) shown in fig. 4, which shall supply each wafer (10) with the pre-established quantity of ice cream for this purpose, in order to achieve the end result shown in FIG. 7, or otherwise it shall feed a ready-formed ice-cream portion into the wafer.

What is claimed is:

1. Machine for manufacturing ices comprising:

a conveyor belt having a loading area fitted with a plurality of trays for housing flat and stiff pieces of wafer a tunnel oven mounted on said conveyor belt beyond said loading area of said conveyor belt for softening said flat and stiff pieces of wafer housed within said trays, a shaping mechanism installed on said conveyor belt in a shaping area after an exit of said tunnel oven in which marginal parts of each tray are folded in an upward direction transforming the wafer housed within said tray into a fluted form, having a U-shaped section with rounded vertices, assisting in the shaping of said pieces of wafer (10)

a pressing mechanism fitted with a plurality of tampers for assisting in the shaping of wafers housed within said trays, which pressing mechanism acts on the trays, and more specifically on an upper face of the wafers located inside said trays, a feeder mechanism located on said conveyor belt beyond said pressing mechanism for filling said fluted form of said wafer with ice cream.

2. Machine, according to claim 1, wherein each tray is made up of:

a central piece having a central vertical plane and fastened to the conveyor belt and which retains a horizontal position permanently, and two side pieces capable of folding towards the central vertical plane of the central piece, each side piece having an outside face, said side pieces having rollers applied to their outside faces, said rollers running along guide rails mounted on a frame of the machine for determining a horizontal position for said foldable side pieces in the loading area of said conveyor belt and in the tunnel oven, and said rollers for the upward folding of said side pieces in the shaping area.

3. Machine, according to claim 1, wherein the pressing mechanism further comprises a rotating drum which, through a shaft and a transmission, is synchronized with the forward motion of the conveyor belt, said drum further comprising a plurality of radial arms terminating in said tampers.

4. Machine, according to claim 1, wherein said feeder mechanism feeds ready-shaped bulk ice cream to the interior of said wafer.

* * * * *